United States Patent [19]

Podrapsky et al.

[11] 4,174,697
[45] Nov. 20, 1979

[54] SYSTEM FOR ADVANCING THE IGNITION TIME IN IGNITION SYSTEMS HAVING A MAGNETO GENERATOR

[75] Inventors: Jiri Podrapsky, Buchschwabach; Josef Orova, Schwabach, both of Fed. Rep. of Germany

[73] Assignee: Robert Bosch GmbH, Stuttgart, Fed. Rep. of Germany

[21] Appl. No.: 875,684

[22] Filed: Feb. 6, 1978

[30] Foreign Application Priority Data

Mar. 5, 1977 [DE] Fed. Rep. of Germany ....... 2709745

[51] Int. Cl.² .......................... F02P 1/00; F02P 5/04
[52] U.S. Cl. ........................... 123/148 E; 123/149 C; 123/117 R
[58] Field of Search ........ 123/149 R, 149 C, 148 CC, 123/148 E

[56] References Cited

U.S. PATENT DOCUMENTS

| | | | |
|---|---|---|---|
| 3,484,677 | 12/1969 | Piteo | 123/148 E |
| 3,898,972 | 8/1975 | Haubner | 123/148 CC |
| 3,900,015 | 8/1975 | Mainprize | 123/148 E |
| 3,933,139 | 1/1976 | Beeghly | 123/148 CC |
| 3,938,491 | 2/1976 | Mazza | 123/148 E |
| 3,963,015 | 6/1976 | Haubner | 123/148 E |
| 4,090,488 | 5/1978 | Ohki | 123/148 E |
| 4,099,509 | 7/1978 | Hashimoto | 123/148 E |

Primary Examiner—Ronald B. Cox
Attorney, Agent, or Firm—Frishauf, Holtz, Goodman & Woodward

[57] ABSTRACT

At higher engine speeds the ignition time is advanced by decreasing the time between the breakdown of a threshold element which breaks down for a predetermined amplitude of voltage across the primary winding of the ignition coil and the furnishing of the signal which causes interruption of the primary current. The time is shortened either by decreasing the time constant of the timing circuit connected to the threshold element, or by switching a second timing circuit having a shorter time constant into the circuit at higher engine speeds.

7 Claims, 3 Drawing Figures

SYSTEM FOR ADVANCING THE IGNITION TIME IN IGNITION SYSTEMS HAVING A MAGNETO GENERATOR

Cross reference to related application, assigned to the assignee of this application:

U.S. Ser. No. 874,651, filed Feb. 3, 1978, PODRAPSKY et al.

The present invention relates to ignition systems having a magneto generator and, more particularly, to such systems wherein it is desired to advance the ignition time at higher engine speeds.

BACKGROUND AND PRIOR ART

In the known ignition system utilizing a magneto, an ignition starting transistor, which is connected in series with the primary winding, is switched to the conductive state at the beginning of the positive voltage half wave in the primary winding of the ignition coil. Primary current therefore flows, which causes a strong magnetic field to be generated in the armature of the magneto generator. When the voltage reaches the maximum value, a threshold element breaks down. This activates a control switch which in turn blocks the ignition starting transistor, thereby interrupting the primary current. A high voltage is therefore induced in the secondary winding of the ignition coil causing a spark to be formed at the spark plug connected thereto.

To give the system the capability of changing the ignition time, a first and second voltage half wave are generated in the primary circuit. The amplitude of the second half wave is larger than that of the first. At lower engine speeds, the threshold element which causes the initiation of the ignition process responds only to the half wave having a large amplitude. Since, for increasing engine speeds, the induced voltages in the primary circuit also increase, the threshold element will respond to the smaller half wave in the higher speed ranges. The ignition time is therefore changed by a predetermined amount, that is advanced by a predetermined amount, when the engine speed reaches a predetermined speed.

Ignition systems, and, particularly, ignition systems used in smaller combustion engines, should be kept at as low a price and require as little space as possible. Therefore, for generating the ignition energy, a permanent magnet is utilized which is rotated by means of a fly wheel or a fan wheel which, in turn, is driven by the engine. The pole shoes of the magnet interact with an armature fastened to the motor housing and having a U shaped or E shaped iron core. In order to generate the above mentioned two sequential positive half waves, the primary voltage must be rectified by power diodes. Further, since the first half wave must be smaller than the second, damping circuits are required, which, in some instances, serve to determined the predetermined speed at which the ignition time is advanced.

It is a further disadvantage of the known system, that the ignition angle, that is the angle by which the ignition time is advanced when the predetermined engine speed is reached, is, to a great extent, determined by the dimensions of the iron core and of the pole shoes of the permanent magnet and therefore cannot be readily adapted to the requirements of the individual engine.

THE INVENTION

It is an object of the present invention to furnish an ignition system which is as simple as possible and yet readily adaptable to the requirements of a particular engine. Further the system is to be reliable and inexpensive.

The present invention teaches an ignition system which has the advantage that only a signle half wave of the primary voltage is required for each ignition process. This greatly simplifies the construction of the ignition system. Briefly, switch means are provided which decrease the time constant of a timing circuit which determines the ignition time. The switch means are speed responsive, that is they switch from a first to a second stable state when the speed of the engine reaches the predetermined speed at which the ignition time is to be advanced. The decrease in the time constant causes an ignition starting transistor which is connected in series with the primary winding to be blocked at an earlier time, thereby advancing the time in the cycle at which the spark is created.

In a first preferred embodiment, the switch means, when switching to the second stable state decrease the time constant of a timing circuit. For example, a first RC circuit has a second RC circuit connected to it at low engine speeds which is disconnected from it by the switch means at the higher engine speeds. The connection and disconnection is accomplished by a transistor which is switched from the conductive to the blocked state at the predetermined engine speed.

In a second preferred embodiment, a first timing circuit is connected to a first threshold means, for example a Zener diode. A second timing circuit is connected to a second threshold means, for example a second Zener diode. At lower engine speeds, the first Zener diode breaks down causing the first timing circuit to control the ignition time. A higher engine speeds the second Zener diode breaks down and its associated timing circuit controls the timing of the spark.

Preferred embodiments of the invention are shown in the drawing, in which.

Figure 1:
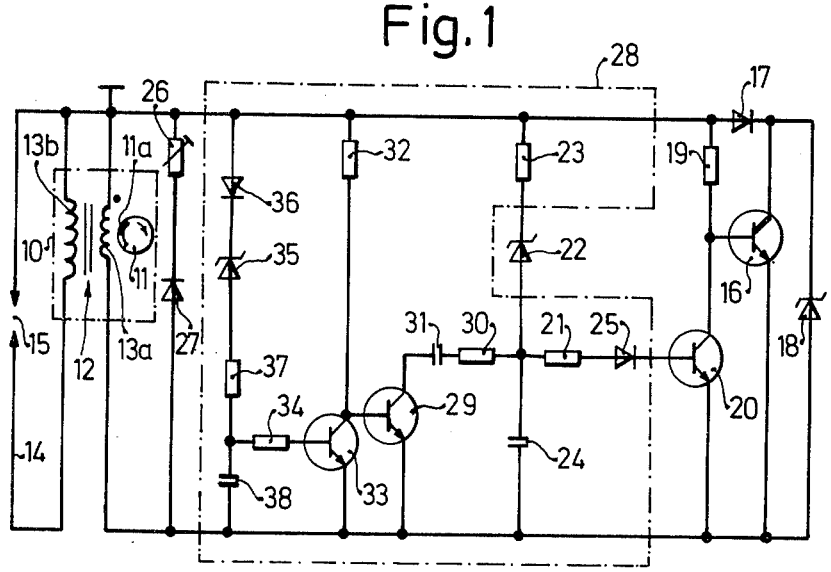
FIG. 1 shows a first embodiment of the present invention incorporated into an ignition system having a magneto generator.

FIG. 1 is a circuit diagram of the ignition system for a single cylinder internal combustion engine which is energized by a magneto 10. Magneto 10 includes a rotating magneto system 11 which includes a permanent magnet 11a arranged between two pole shoes and mounted on the outer perimeter of a fly-or fan-wheel of the engine. The magneto system 11 cooperates with an armature 12 which is mounted in the housing of the engine. The armature also serves as the ignition coil and has a primary winding 13a and a secondary winding 13b. The secondary winding is connected through a cable 14 to a spark plug 15. The primary winding 13a is connected to a primary circuit which includes an ignition starting transistor 16 which is an NPN transistor. Transistor 16 is arranged as a Darlingston switch. Its collector is connected through a diode 17 to the end of primary winding 13a which is connected to the reference potential (eg chassis). The emitter of transistor 16 is connected to the other end of primary winding 13a. A diode 17 serves to block inverse current and is connected between the emitter-collector circuit of transistor 16 and the primary winding. A Zener diode 18 is connected in parallel with transistor 16 to protect it from overvoltages. The base of transistor 16 is connected to its collector through a resistor 19. The base-emitter circuit of transistor 16 is connected in parallel with the emitter-collector circuit of a control transistor 20, which is an NPN transistor. The base of transistor 20 is connected through a resistor 21 and a diode 25 to the anode of a Zener diode 22 whose cathode is connected through a resistor 23 to the reference potential. Zener diode 22 serves as a first threshold means. A capacitor 24 is connected between the anode of Zener diode 22 and a common line connecting the emitters of transistors 16 and 20 to the other side of primary winding 13a. Also connected in parallel with the primary winding 13a is the series circuit comprising an adjustable resistor 26 and a diode 27. Diode 27 is blocked during the half wave of magneto generator 10 which is utilized for ignition. During the half wave not utilized for ignition, this circuit serves to dampen the undesired half wave. The degree of damping is adjustable by adjustment of resistor 26.

Figure 2:
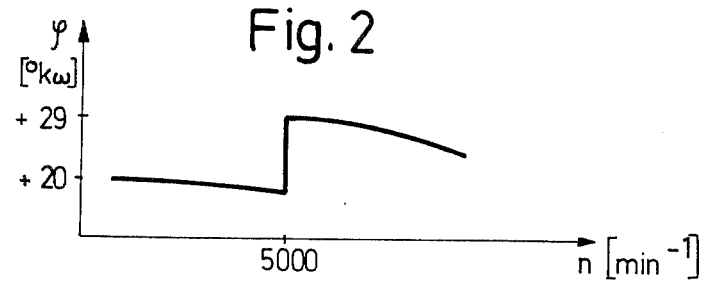
FIG. 2 is a characteristic curve of ignition angle vs. speed for the ignition systems of FIGS. 1 and 3; and, FIG. 3 is a second embodiment of the present invention.

FIG. 2 shows a curve of ignition angle plotted against engine speed. When idling, the ignition time should correspond to about 20 degree camshaft rotation ahead of the top dead center position of the piston for stability and to assure a relatively clean exhaust. As the engine speed increases, the ignition time is somewhat delayed because of the armature reaction of the magneto generator 10. At an engine speed of about 5,000 rotations per minute, a sudden change of the ignition time to approximately 29 degrees of camshaft rotation preceding the top dead center position takes place. Again, as the engine speed increases, the ignition time will be somewhat delayed relative to the new starting point of 29 degrees of camshaft rotation.

OPERATION

Positive and negative voltage half waves are induced in the primary winding 13a of armature 12 by the rotating magneto system 11. When viewed from the terminal of primary winding 13a which is connected to the reference potential, positive voltage waves are damped sufficiently by diode 27 and resistor 26 that they do not damage any of the elements in the circuit. The negative voltage half waves are utilized to furnish the ignition energy and to initiate the spark. At the beginning of each negative voltage half wave, a control current flows through resistor 19 to the base-emitter circuit of transistor 16, thereby causing transistor 16 to become conductive. Primary current therefore flows through the emitter-collector circuit of transistor 16. If the voltage across the primary winding reaches the threshold value of approximately 4 volts of Zener diode 22, this diode becomes conductive and a control current flows over resistor 23 which charges capacitor 24. Transistor 29 is also in the conductive state since current flows in its base-emitter circuit over resistor 32. Therefore capacitor 31 also begins to charge. At the ignition time, the voltage across capacitor 24 reaches the threshold of transistor 20 whose base is connected to capacitor 24 through resistor 21. Transistor 20 becomes conductive. Its emitter-collector circuit short-circuits the base-emitter circuit of transistor 16, causing transistor 16 to switch to the blocked state instantaneously. The primary current is thus suddenly interrupted, thereby causing a high voltage pulse to be induced in primary winding 13a and in secondary winding 13b. The high voltage pulse in secondary winding 13b causes a spark to be generated at spark plug 15. Since resistor 21 at the base of transistor 20 retards the discharge of capacitors 24 and 31 and since, in addition, the voltage pulse appearing across primary winding 13a is applied through Zener diode 22 to the base of transistor 20, transistor 20 will remain conductive throughout the ignition process causing transistor 16, to remain blocked. To protect transistor 16 from overvoltages, Zener diode 18 limits the voltage appearing across the primary to about 300 volts.

As mentioned above, the armature reaction of the magneto causes increasing delays of the negative voltage half wave with increasing engine speed. Since, however, the rate of rise of voltage increases with increasing speed, the actual delay in the ignition time in the intermediate speed range is relatively small even when no compensatory measures are taken. However, to improve the efficiency of the engine it is desirable to advance the ignition time when the engine reaches a predetermined speed. This speed is 5,000 r.p.m. in the embodiment shown in FIG. 1, for which the characteristic curve is shown in FIG. 2. This sudden advance in the ignition time is accomplished by transistor 29. When transistor 29 is conductive, resistor 30 and capacitor 31 are connected in parallel with capacitor 24, thereby increasing the time constant, that is the time period starting after breakdown of Zener diode 22 and lasting until the voltage across capacitor 24 reaches the voltage required to switch transistor 20 to the conductive state. Typical values of capacitor 24, capacitor 31, resistor 23 and resistor 30 are, respectively: $0,1 \div 0,68$ $\mu$F, $0,1 \div 0,68$ $\mu$F, $680\Omega \div 2,2$ k$\Omega$, $100\Omega \div 680\Omega$ When the predetermined engine speed is reached at which the ignition time is to be advanced, the threshold voltage of approximately 5 volts of Zener diode 34 is also reached before initiation of the ignition process, so that a current flows through diode 36, Zener diode 35 and resistor 37 to charge capacitor 38. As soon as the voltage across capacitor 38 reaches a value required to switch transistor 33 to the conductive state, transistor 29 blocks, since its base-emitter circuit is then short-circuited. The series circuit of capacitor 31 and resistor 30 which was previously connected in parallel with capacitor 24 is then disconnected. The time constant of circuit 28 is therefore decreased. Capacitor 24 charges at a much more rapid rate through resistor 23 and Zener diode 22 and therefore causes transistor 20 to be switched to the conductive state at a substantially earlier time. In this way, as shown in FIG. 2, the ignition time is advanced by approximately 4 degrees of camshaft rotation when the speed of the engine reaches 5,000 r.p.m.

Figure 3:
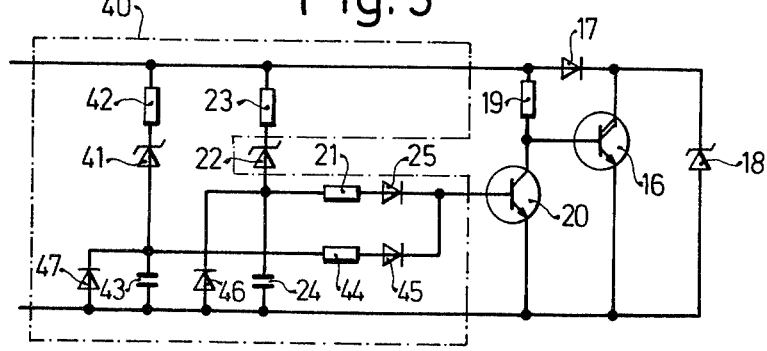

Following the end of the ignition process, capacitor 38 discharges through resistor 34 and the base-emitter circuit of transistor 33 until transistor 33 again becomes blocked. The above operation is repeated for each rotation of the camshaft. As soon as the engine speed decreases to less than the predetermined speed, Zener diode 35 prevents charging of capacitor 38 and therefore the disconnection of capacitor 31 from the circuit by transistors 33 and 29 prior to the ignition time. Thus, in the lower speed range, the time constant of circuit 28 is increased by capacitor 31 and, therefore, the ignition time of the engine is retarded by approximately 4 degrees of camshaft rotation. The magnitude of the change in ignition time occurring at the predetermined speed depends upon the relative values of capacitor 24 and resistor 23 on the one hand and capacitor 31 and resistor 30 on the other. The critical speed (predetermined speed) at which the change will take place depends upon the value of Zener diode 35 as related to the rest of the circuit and in particular as related to the values of resistor 37 and capacitor 38. Preferred values for the embodiment shown in FIG. 1 are as follows:

Zener diode 35—breakdown—2,7 V ÷ 4,7 V
Resistor 37—1 kΩ ÷ 3,3 kΩ
Capacitor 38—0,1 ÷ 0,82 μF In FIG. 3, the circuit enclosed in dashed line 40 replaces circuit 28 and furnishes the ignition control signal, that is the signal switching transistor 20 to the conductive state, to the base of transistor 20 at the ignition time. Zener diode 22, resistor 23 and capacitor 24 are again connected in series and the so-formed series circuit is connected in parallel with the primary winding of the ignition coil. Again, the voltage across capacitor 24 is applied to the base of transistor 20 through resistor 21 and diode 25. However, in FIG. 3, a second series circuit including a Zener diode 41, a resistor 42 and a capacitor 43 is connected in parallel with the primary winding 13a of the ignition coil. A diode 47 is connected in parallel with a capacitor 43. A voltage across capacitor 43 is applied to the base of transistor 20 through a resistor 44 and a diode 45. A diode 46 is connected in parallel with capacitor 24. The time constant of the circuit including resistor 23 and capacitor 24 is higher than that of resistor 42 and capacitor 43. Typical values for resistor 23, capacitor 24, resistor 42 and capacitor 43 are, respectively: 1 kΩ ÷ 3,3 kΩ; 0,1 ÷ 0,82 μF; 1 kΩ ÷ 3,3 kΩ; 0,1 ÷ 0,82 μF The threshold value of Zener diode 22 is approximately 4 volts, while the threshold value of Zener diode 41 is approximately 5 volts. Diodes 46 and 47 serve to bypass capacitors 24 and 43 respectively during the positive half waves of the magneto generator. Diodes 25 and 45 serve to decouple the two RC circuits from each other.

Operation. In the lower speed range, as previously explained with reference to FIG. 1, when the threshold value of Zener diode 22 is passed, capacitor 24 charges and, when it reaches a voltage adequate to switch transistor 20 to the conductive state, transistor 16 blocks, causing the spark to be initiated. Only when the predetermined speed is reached is capacitor 43 also charged through Zener diode 41. Since the RC circuit of resistor 42 and capacitor 43 has a much smaller time constant, capacitor 43 will be charged to the value required to switch transistor 20 to the conductive state at a much earlier time, so that the blocking of transistor 16 takes place about 4 degrees of camshaft angle ahead of the previous ignition time. The action of the circuit will thus yield the same characteristic curve shown in FIG. 2. In other words, when the predetermined speed is reached, the time period between the breakdown of Zener diode 22 and the start of ignition (the blocking of transistor 16) is decreased when the speed of the motor increases above the predetermined speed.

The present invention is not to be limited to the embodiments shown, since other circuits can readily be used for the timing circuits and to effect the switching of the time constant at the predetermined speed. Further, in a preferred embodiment, the time constant is reduced to zero when the speed exceeds the predetermined speed, so that the voltage resulting from the breakdown of Zener diode 22 is applied without delay to the base of transistor 20, causing it to switch to the conductive state.

Various changes and modifications may be made within the scope of the inventive concept.

We claim:

1. In an ignition system for an internal combustion engine, said ignition system having a rotating magneto system driven by said engine and armature means including a primary winding (13a) and a secondary winding (13b) cooperating with said rotating magneto system, a spark plug connected to said secondary winding, and ignition starting means (16) connected to said primary winding for starting the ignition process in response to an ignition timing signal:

timing means (28, 20) connected to said primary winding and said ignition starting means, for furnishing said ignition starting signal to said ignition starting means at first predetermined instants in the cycle of said engine when said engine is operating at a speed less than a predetermined speed, and at second time instants preceding said first time instants in each cycle of said engine when said engine is operating at a speed exceeding said predetermined speed, said timing means comprising threshold means (22) for furnishing a first threshold signal when the voltage across said primary winding exceeds a first predetermined voltage;

time constant furnishing means (31, 30, 24, 23) connected to said threshold means for furnishing said ignition starting signal a predetermined time period following receipt of said first threshold signal;

switch means (29; 41) having a first and second stable state, connected to said time constant furnishing means, for shortening said predetermined time period when in said second stable state; and connecting means for connecting said switch means to said primary in such a manner that said switch means switches from said first to said second stable state prior to the ignition time when the speed of said engine exceeds said predetermined speed.

2. Apparatus as set forth in claim 1, wherein said time constant furnishing means comprises a first RC circuit (23, 24), and a second RC circuit (30, 31);

and wherein said switch means connects said second RC circuit to said first RC circuit in such a manner as to increase the time constant thereof when in said first stable state.

3. Apparatus as set forth in claim 2, wherein said switch means is a switching transistor (29) having an emitter-collector circuit connected in series with said second RC circuit and having a base;

and wherein said connecting means further comprises base control means (35, 33) for controlling the base voltage of said switching transistor in such a manner that said switching transistor switches from the conductive to the blocked state prior to the ignition time when the speed of said engine exceeds said predetermined speed.

4. Apparatus as set forth in claim 3, wherein said base control means comprises second threshold means (35) for furnishing a second threshold signal when the voltage across said primary winding exceeds a second predetermined voltage higher than said first predetermined voltage, and base control transistor means (33) connected to said second threshold means and said switching transistor, for short-circuiting the base-emitter circuit of said switching transistor in response to said second threshold signal.

5. Apparatus as set forth in claim 4, wherein said second threshold means comprises a Zener diode.

6. Apparatus as set forth in claim 4, further comprising a third RC circuit (37, 38) connected in series with said second threshold means; and further comprising means (34) for connecting the base of said base control transistor to said third RC circuit.

7. Apparatus as set forth in claim 1, wherein said time constant furnishing means comprises first timing means (23, 24) connected to said first threshold means for furnishing said ignition timing signal at said predetermined time period following receipt of said first threshold signal, second threshold means (41) for furnishing a second threshold signal when the voltage across said primary winding exceeds a second predetermined voltage higher than said first predetermined voltage, second timing means (42, 43) connected to said second threshold means for furnishing ignition timing signals a second predetermined time period following receipt of said second threshold signal, said second predetermined time period being less than said first predetermined time period, and first and second means (21, 25; 44, 45) for, respectively, connecting said first and second timing means to said ignition starting means.

* * * * *